United States Patent
Pandey et al.

(10) Patent No.: US 10,007,751 B2
(45) Date of Patent: *Jun. 26, 2018

(54) USE OF NET-BASED TARGET CONGESTION RATIOS IN GLOBAL ROUTING

(71) Applicant: International Business Machines Corporation, Armonk, NY (US)

(72) Inventors: Diwesh Pandey, Bangalore (IN); Sven Peyer, Tuebingen (DE); Yaoguang Wei, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/437,781

(22) Filed: Feb. 21, 2017

(65) Prior Publication Data

US 2017/0351801 A1 Dec. 7, 2017

Related U.S. Application Data

(63) Continuation of application No. 15/172,722, filed on Jun. 3, 2016.

(51) Int. Cl.
*G06F 17/50* (2006.01)
(52) U.S. Cl.
CPC ...... *G06F 17/5077* (2013.01); *G06F 2217/06* (2013.01)

(58) Field of Classification Search
CPC ............. G06F 17/5068; G06F 17/5077; G06F 17/5081; G06F 2217/06
See application file for complete search history.

(56) References Cited

U.S. PATENT DOCUMENTS

2015/0178437 A1\* 6/2015 Zhang ................ G06F 17/5081
716/113

OTHER PUBLICATIONS

Diwesh Pandey, et al., Pending U.S. Appl. No. 15/172,722 entitled "Use of Net-Based Target Congestion Ratios in Global Routing," filed with the U.S. Patent and Trademark Office on Jun. 3, 2016.
List of IBM Patents or Patent Applictions Treated as Related; (Appendix P), Filed Feb. 21, 2017, 2 pages.

\* cited by examiner

*Primary Examiner* — Nha Nguyen
(74) *Attorney, Agent, or Firm* — Cantor Colburn LLP; Margaret A. McNamara (57) ABSTRACT

According to an aspect, a plurality of nets are grouped into a plurality of buckets based on timing criticalities associated with the nets, and different TCRs are assigned to each of the buckets. For each of the nets, a TCR for the net is determined based on the TCR assigned to the bucket containing the net. Global routing of the net is performed according to the TCR and to one or more constraints associated with the net. The TCR for the net is incremented by a specified amount in response to the global routing of the net resulting in violating at least one of the one or more constraints associated with the net and to a stopping criteria not being met. The performing global routing and incrementing the TCR for the net is repeated.

7 Claims, 5 Drawing Sheets

USE OF NET-BASED TARGET CONGESTION RATIOS IN GLOBAL ROUTING

DOMESTIC PRIORITY

This application is a continuation of U.S. patent application Ser. No. 15/172,722, filed Jun. 3, 2016, the content of which is incorporated by reference herein in its entirety.

BACKGROUND

The present disclosure relates generally to integrated circuit design, and more specifically, to using net-based target congestion ratios in global routing.

The design of the layout of an integrated circuit typically includes both global routing and detailed routing. Global routing is used to find a rough path for each net by defining routing regions and generating a tentative route that specifies a set of routing regions traversed for each net being routed. During the global routing process, each net is assigned to a set of routing regions however the actual layout of wires is not specified. The actual layout of wires used by the nets is typically specified during detailed routing. During detailed routing, for each routing region, each net that passing through that region is assigned particular routing tracks and the layout of the wires is fixed.

Routing has a big impact on the yield of integrated circuits. Some common problems affected by routing that can lead to yield loss include random open defects and random short defects. Random open defects are defects that can occur when wire width is too small. Random short defects are defects that can occur when wire spacing is too small. Wire spreading in global routing is a technique that has been used to improve yield in routing.

SUMMARY

Embodiments include a method, system, and computer program product for using net-based target congestion ratios (TCRs) in global routing. The method includes grouping a plurality of nets into a plurality of buckets, the grouping based on timing criticalities associated with the nets. Different TCRs are assigned to each of the plurality of buckets. The TCRs are selected for each bucket based on the timing criticalities associated with the nets in the bucket. For each of the plurality of nets, a TCR for the net is determined based on the TCR assigned to the bucket containing the net. Global routing of the net is performed according to the TCR and to one or more constraints associated with the net. The TCR for the net is incremented by a specified amount in response to the global routing of the net resulting in violating at least one of the one or more constraints associated with the net and to a stopping criteria not being met. The performing global routing and incrementing the TCR for the net is repeated until at least one of the performing global routing of the net results in all of the one or more constraints being met and the stopping criteria is met.

These and other aspects of the present disclosure will become apparent from the following description of the preferred embodiment taken in conjunction with the following drawings and their captions, although variations and modifications therein may be affected without departing from the spirit and scope of the novel concepts of the disclosure.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Embodiments described herein are directed to utilizing net-based target congestion ratios (TCRs) in global routing of integrated circuits. Embodiments include an integrated method to allow for more wire spreading during the global routing process while considering timing. Embodiments provide a shift from a tile-based perspective to a net-based perspective during global routing.

Figure 1:
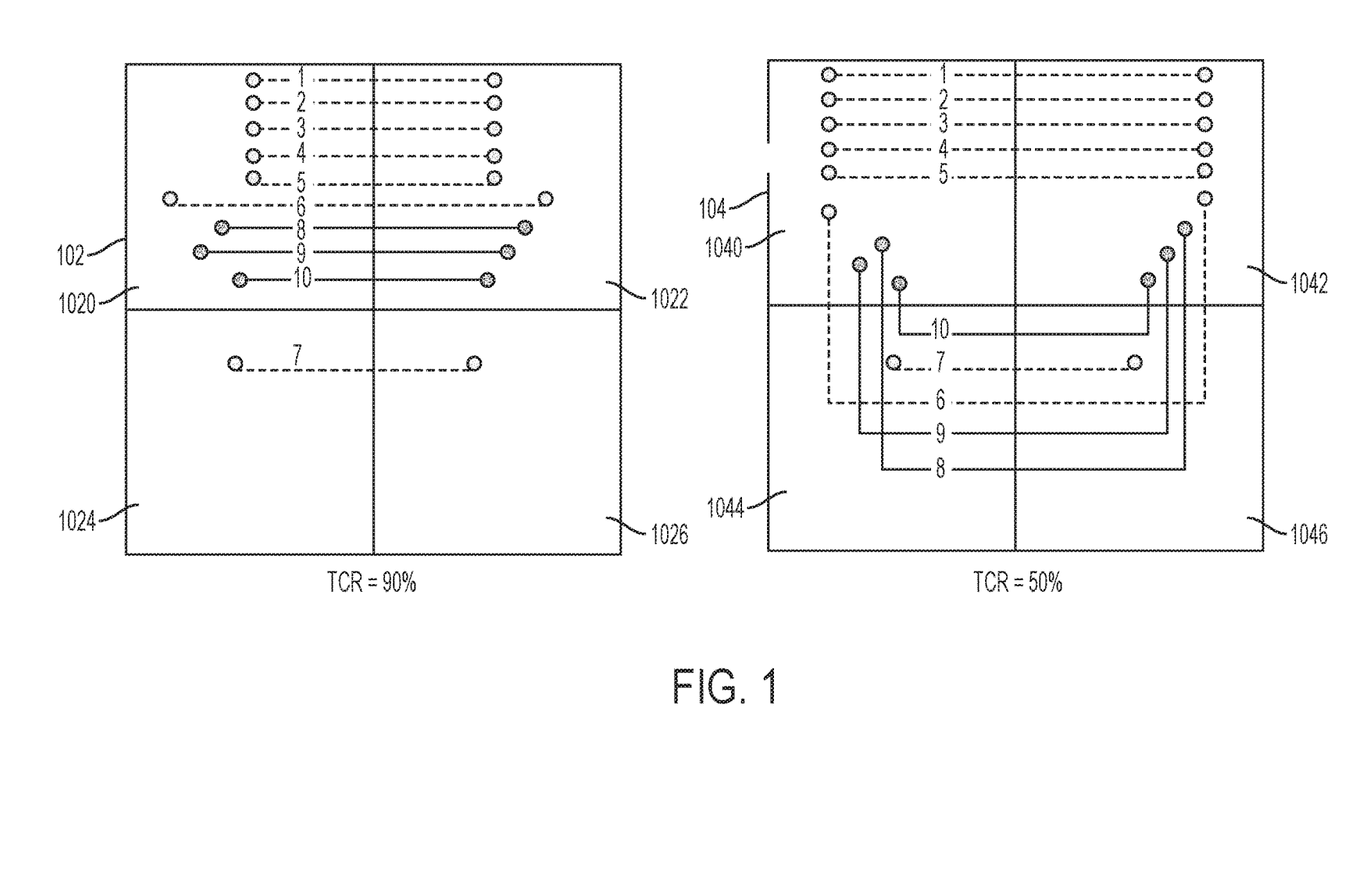
FIG. 1 depicts a block diagram of wire placement on circuits that are generated by a global routing process that utilizes the same target congestion ratio (TCR) between all edges.

Turning now to FIG. 1, a block diagram of wire placement on circuits that are generated by a global routing process that utilizes the same TCR between all edges is generally shown. A global routing edge connects two neighboring global routing tiles in region 102. As shown in FIG. 1, an edge connects tile 1020 to tile 1022, tile 1020 to tile 1024, tile 1022 to tile 1026, and tile 1024 to tile 1026. Nets 1-7, which are indicated by broken lines in FIG. 1, have a timing criticality of "critical" and nets 8-10, which are indicated by solid lines, have a timing criticality of "non-critical." Nets 1-6 and 8-10 are routed from tile 1020 to tile 1022, and net 7 is routed from tile 1024 to tile 1026.

The term "target congestion ratio", or "TCR", refers to a threshold at which an edge in a global routing process is considered to be congested. The TCR typically leaves some margin for the detailed router to find a feasible embedding of wiring segments. For example, for a global routing edge that has a capacity of ten, the TCR may be set to 90% so that the global router will pack at most nine wires on an edge. With the TCR set to 90%, in an edge with a capacity of ten, after nine wires have crossed the edge, the global router will try to detour from this connection although there is still one track available. In a typical global router this free track will only be used if no other feasible solution can be found.

As shown in FIG. 1, a global TCR can be used to influence wire spreading. Region 102 in FIG. 1 contains tile 1020, tile 1022, tile 1024, and tile 1026, and shows the results of a contemporary global routing process with a TCR of 90% for edges with a capacity of ten. As shown in FIG. 1, wires from nine nets (1-6 and 8-10) are placed across the edge between tile 1020 and tile 1022, and the tenth wire from net 7 is placed across the edge between tile 1024 and tile 1026. In exemplary region 102, the result of the global routing is that wires are densely packed into the edge between tiles 1020 and 1022.

The wire spreading can be increased by decreasing the value of the TCR. For example, region 104 in FIG. 1 contains tile 1040, tile 1042, tile 1044, and tile 1046, and shows the results of a contemporary global routing process with a TCR of 50% for edges with a capacity of ten. As shown in FIG. 1, wires from five nets (1-5) that connect tile 1040 to tile 1042 are placed across the edge between tile 1040 and tile 1042. The wires from the other four nets (6, 8-10) that connect tile 1040 to tile 1042 are placed across three edges: the edge between tile 1040 and tile 1044, the edge between tile 1044 and tile 1046, and the edge between tile 1046 and 1042. As compared to region 102, in region 104, the wires are more spread out, however the timing of nets 6 and 8-10 is worse because the wires are now traversing three edges instead of a single edge. This increase in timing can be problematic for nets having high timing criticalities, such as net 6 which has a timing criticality of "critical." Thus, using a small TCR globally can improve yield, however it may make timing worse.

Figure 2:
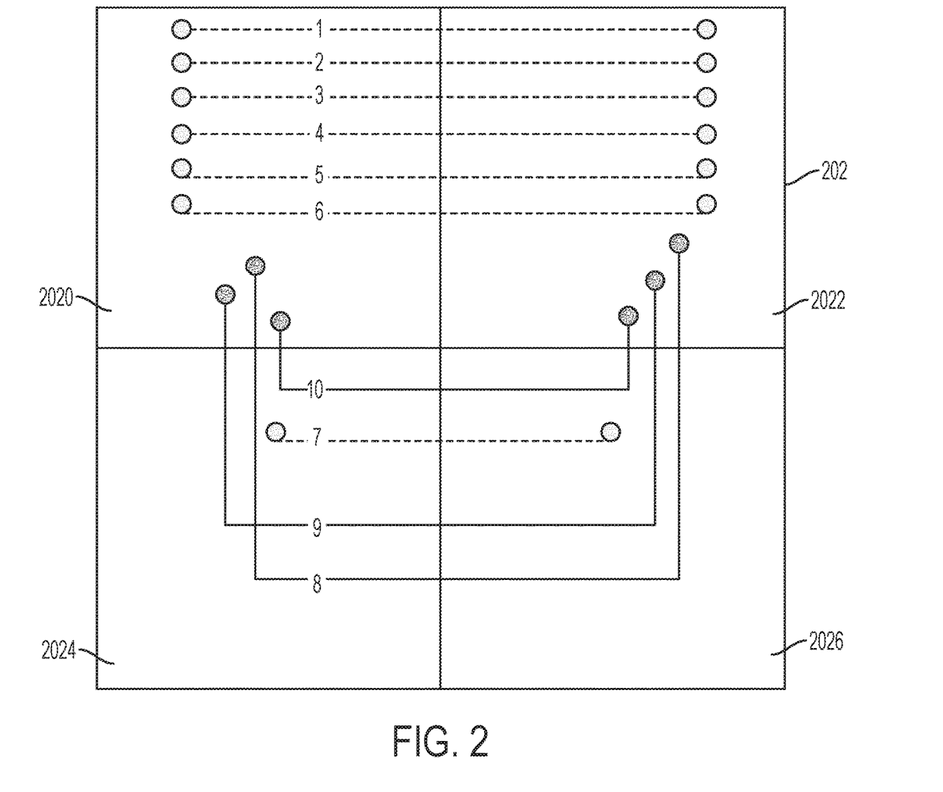
FIG. 2 depicts a block diagram of wire placement on circuits that are generated by using net-based TCRs in global routing in accordance with one or more embodiments.

Turning now to FIG. 2, a block diagram of wire placement on circuits that are generated using net-based TCRs in global routing is generally shown in accordance with one or more embodiments. As shown in FIG. 2, embodiments include the use of different TCRs for different nets. In FIG. 2, nets that have a timing criticality of "critical" (nets 1-7), are assigned a TCR of 90% and nets that have a timing criticality of "non-critical" (nets 8-10) are assigned a TCR of 50%. Nets that have a timing criticality of "critical" have a higher timing criticality than nets that have a timing criticality of "non-critical." In embodiments, global wires for nets are placed in the region in decreasing order of timing criticality, with nets having the highest timing criticality placed by the global router with preference. As shown in FIG. 2, nets 1-6 are placed across the edge between tile 2020 and tile 2022 using a TCR of 90%. Nets 8-10 are routed next with a TCR of 50% and thus, cannot be placed across the edge between tile 2020 and 2022 because there are already six wires placed there, that is the congestion across the edge is 60%. Nets 8-10 are placed so that they are routed from tile 2020 to tile 2022 by traversing the edges between tile 2020 and tile 2024, tile 2024 and title 2026, and tile 2026 and tile 2022. The additional length of the path for nets 8-10 may comply with timing constraints because these nets have a timing criticality of "non-critical" which implies that they can absorb the extra time introduced by the longer path lengths.

As shown in FIG. 2, the use of net-based TCRs can allow the use of a small TCR for non-timing-critical nets to automatically spread the wires (e.g., by taking a detour) to improve yield. The use of net-based TCR can also allow the use of a large TCR for timing-critical nets to ensure timing quality by limiting timing critical nets from making a detour.

Figure 3:
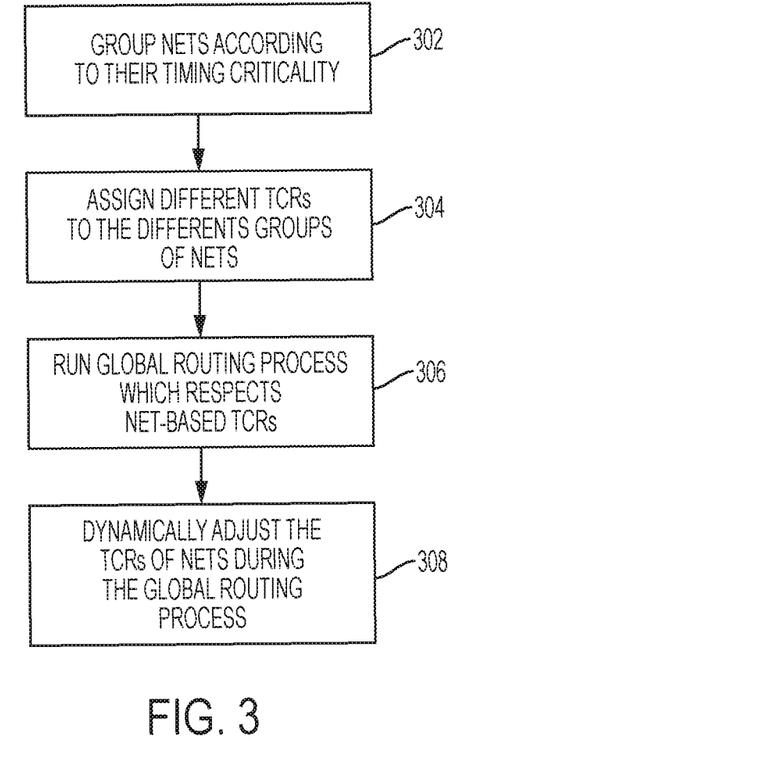
FIG. 3 depicts a high level flow diagram of a process for using net-based TCRs in global routing in accordance with one or more embodiments.

Turning now to FIG. 3, a high level flow diagram of a process for using net-based TCRs in global routing is generally shown in accordance with one or more embodiments. At block 302, timing criticalities are provided for each net, and the nets are grouped (e.g., into a plurality of buckets) according to their timing criticalities. As used herein the term "timing criticality" refers to slack of the nets. The smaller the slack of a net the more timing critical the net. If nets have positive slack then they have enough margin to meet the timing. Nets can be sorted in the decreasing order of their slack values. Nets having worst negative slack in the ordered list are put in the category of most critical nets. Timing criticalities can be expressed in relative terms such as a range from 1-5 with 1 indicating most critical and 5 indicating least timing critical, or vice versa with 1 indicating least timing critical and 5 indicating most timing critical. Timing criticalities can also be expressed as labels such as "non-critical", "critical", and "most critical." In one or more other embodiments there are just two timing criticalities, "critical" and "non-critical." In one or more other embodiments, timing criticality of a net is relative to other nets and the nets are ranked from most timing critical to least timing critical.

At block 304, different TCRs are assigned to the different groups of nets. The TCRs are selected based on the timing criticalities associated with the nets in the buckets. For example, a TCR value is assigned to each group, or bucket, in their increasing order of criticality. In one or more embodiments, timing critical nets are assigned a normal TCR (e.g., 90%) and non-timing critical nets are assigned a smaller TCR (e.g., 85%, 80%, or 50%). As shown in reference to FIGS. 1 and 2, a smaller TCR value will force a non-critical net to allow for more spreading.

At block, 306, a global routing process which respects net-based TCRs is executed. In one or more embodiments, this includes performing for each of the plurality of nets: determining a TCR for the net based on the TCR assigned to the bucket containing the net; and performing global routing of the net according to the TCR for the net and to one or more constraints associated with the net. Also for each net, at block 308, the TCR is incremented by a specified amount (e.g., 3%, 5%, 10%) in response to the performing of the global routing of the net resulting in violating at least one of the one or more constraints associated with the net and to a stopping criteria not being met. The performing global routing and incrementing are repeated until the performing global routing of the net results in all of the one or more constraints being met or a stopping criteria is met. Examples of stopping criteria include, but are not limited to a number of passes of performed iterations or a runtime limit. The constraints can include routing constraints such as, but not limited to congestion constraints, length constraints (e.g., maximum length is 3 segments/edges crossed), scenic ratio constraints (e.g., no detour adds more than 30% to the length), and/or timing constraints.

Figure 4:
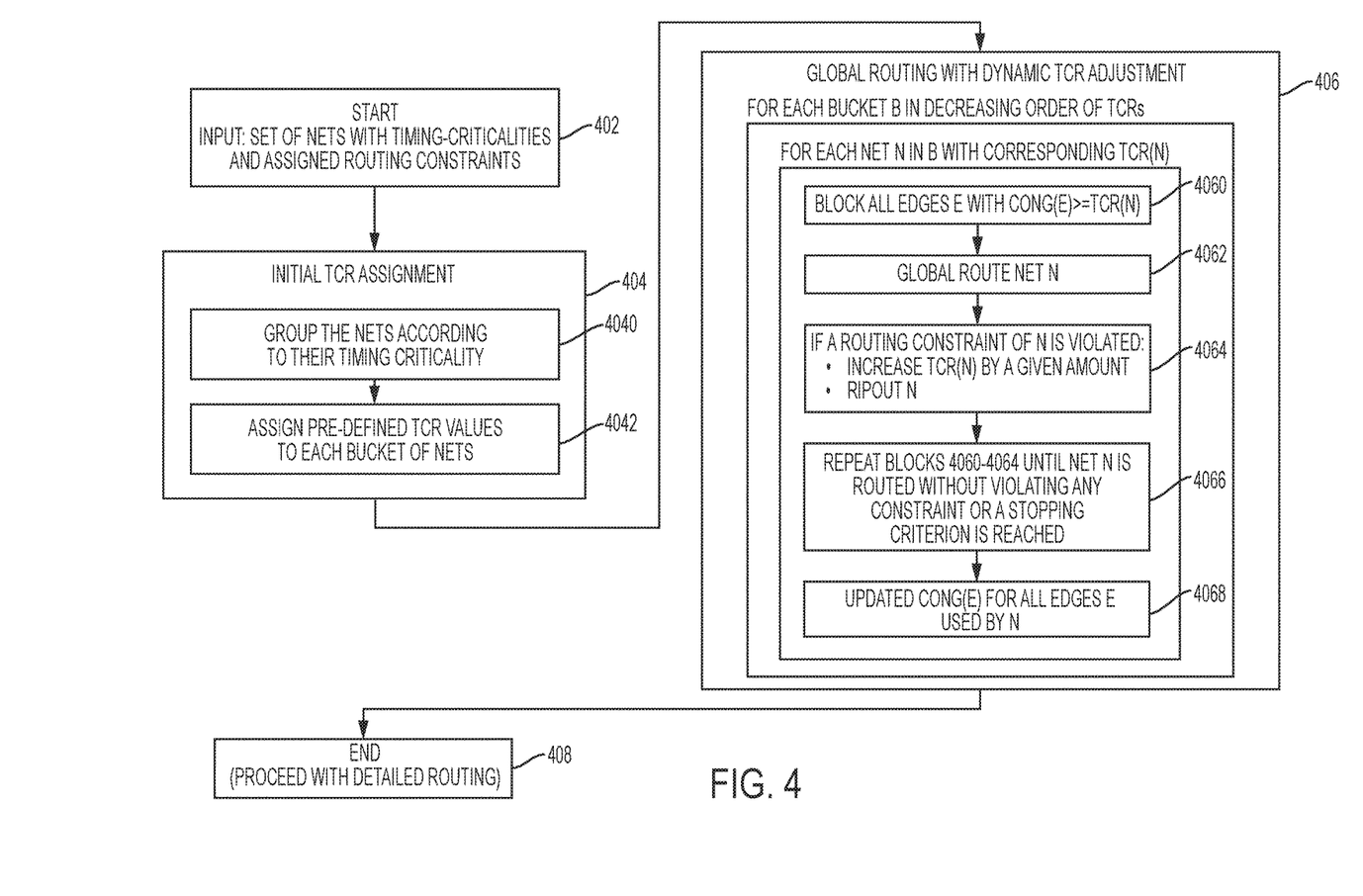
FIG. 4 depicts a flow diagram of a process for using net-based TCRs in global routing in accordance with one or more embodiments.

Turning now to FIG. 4, a flow diagram of a process for using net-based TCRs in global routing is generally shown in accordance with one or more embodiments. At block 402, each net is assigned a timing criticality, or slack, based for example, on a prior timing analysis. Each net is also assigned a set of routing constraints. At block 404, initial TCRs are assigned to the nets. At block 4040, the nets are grouped according to their timing criticality (also referred to as "slack"). In one or more embodiments, this is performed by defining a number, n, of buckets, and for each bucket B, how many nets will be assigned, $r_i$. The nets are sorted into buckets $B_1$ to $B_n$ in decreasing order of their criticality. For example, the top $r_1$% timing critical nets are assigned bucket $B_1$, the next $r_2$% timing critical nets are assigned bucket $B_2$, and so on until the least $r_n$ % timing critical (uncritical) nets are assigned bucket B. At block 4042, pre-defined TCR values are assigned to each bucket of nets. This can be performed by assigning $TCR_i$ to all nets in bucket $B_i$, and choosing decreasing values for $TCR_i$ as i increases. That is, the less timing critical the nets in the bucket, the smaller the corresponding TCR. In this manner, a new net constraint, net-based TCR, is initialized for each net.

For example, there may be five buckets as follows: $B_1$ is assigned a TCR of 95% and includes the top 5% of critical nets; $B_2$ is assigned a TCR of 92% and includes the next 10% of critical nets; $B_3$ is assigned a TCR of 89% and includes the next 15% of critical nets; $B_4$ is assigned a TCR of 86% and includes the next 20% of critical nets; and $B_5$ is assigned a TCR of 80% and includes the remaining 50% of non-critical nets.

At block 406, global routing with dynamic TCR adjustment is performed. The routing is performed for each net, N, in each bucket in order of decreasing TCR. In this manner, nets having a higher timing criticality are routed before nets having a lower timing criticality. Thus, global routing is performed for all of the nets in $B_1$, followed by nets in $B_2$, followed by nets in $B_3$, etc. At block 4060, the global router ensures that net N in consideration can only traverse an edge if the current congestion of that edge is smaller than the TCR of N (otherwise, the TCR constraint is violated). At block 4062 a global routing algorithm is applied to perform the global routing of net N. Examples of global routing algorithms that can be used include, but are not limited to resource sharing algorithm, multi-commodity-flow approximation algorithm, and integer linear programming.

At block 4064 it is determined whether a routing constraint of N is violated, and if a routing constraint of N is violated, then the TCR of N is increased by a given amount and N is ripped out of the global routing plan. The pre-assigned TCR may lead to a violation of other routing constraints and block 4064 accounts for this by providing a dynamic adjustment of the TCR of N. If a net being routed is violating a routing constraint (e.g., a scenic ratio), then the TCR can be increased by a fixed amount (e.g., 2%, 3%, 5%, 10%), which allows the net to be routed with a smaller detour (e.g., smaller scenic ratio) than the previous iteration. At block 4066, blocks 4060-4064 are repeated until net N is routed without violating any constraint or a stopping criterion is reached. At block 4068, the congestion value is updated for all edges used by net N. At block 408, global routing is complete and detailed routing can be performed.

Figure 5:
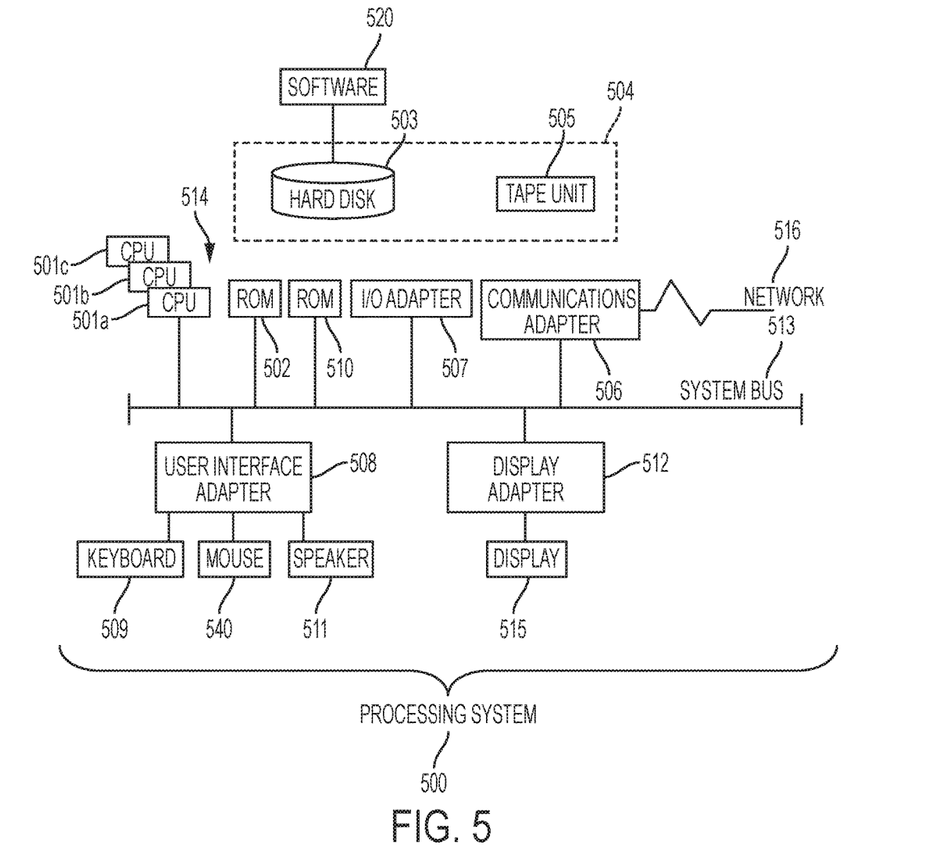
FIG. 5 depicts a processing system for using net-based TCRs in global routing in accordance with one or more embodiments.

Turning now to FIG. 5, a processing system 500 for using net-based TCRs in global routing is generally shown in accordance with one or more embodiments. In this embodiment, the processing system 500 has one or more central processing units (processors) 501*a*, 501*b*, 501*c*, etc. (collectively or generically referred to as processor(s) 501). Processors 501, also referred to as processing circuits, are coupled to system memory 514 and various other components via a system bus 513. Read only memory (ROM) 502 is coupled to system bus 513 and may include a basic input/output system (BIOS), which controls certain basic functions of the processing system 500. The system memory 514 can include ROM 502 and random access memory (RAM) 510, which is read-write memory coupled to system bus 513 for use by processors 501.

FIG. 5 further depicts an input/output (I/O) adapter 507 and a network adapter 506 coupled to the system bus 513. I/O adapter 507 may be a small computer system interface (SCSI) adapter that communicates with a hard disk 503 and/or tape storage drive 505 or any other similar component. I/O adapter 507, hard disk 503, and tape storage drive 505 are collectively referred to herein as mass storage 504. Software 520 for execution on processing system 500 may be stored in mass storage 504. The mass storage 504 is an example of a tangible storage medium readable by the processors 501, where the software 520 is stored as instructions for execution by the processors 501 to perform a method, such as the processing described in reference to FIGS. 1-4. Network adapter 506 interconnects system bus 513 with an outside network 516 enabling processing system 500 to communicate with other such systems. A screen (e.g., a display monitor) 515 is connected to system bus 513 by display adapter 512, which may include a graphics controller to improve the performance of graphics intensive applications and a video controller. In one embodiment, adapters 507, 506, and 512 may be connected to one or more I/O buses that are connected to system bus 513 via an intermediate bus bridge (not shown). Suitable I/O buses for connecting peripheral devices such as hard disk controllers, networks, and graphics adapters typically include common protocols, such as the Peripheral Component Interconnect (PCI). Additional input/output devices are shown as connected to system bus 513 via user interface adapter 508 and display adapter 512. A keyboard 509, mouse 540, and speaker 511 can be interconnected to system bus 513 via user interface adapter 508, which may include, for example, a Super I/O chip integrating multiple device adapters into a single integrated circuit.

Thus, as configured in FIG. 5, processing system 500 includes processing capability in the form of processors 501, and, storage capability including system memory 514 and mass storage 504, input means such as keyboard 509 and mouse 540, and output capability including speaker 511 and display 515. In one embodiment, a portion of system memory 514 and mass storage 504 collectively store an operating system to coordinate the functions of the various components shown in FIG. 5.

Technical effects and benefits include the ability to automatically pack global wires less densely, while inherently considering timing considerations, in order to allow wire spreading in the detailed routing process. Embodiments do not require an extra global routing step which can lead to saving resources used by global routing. Embodiments described herein can be utilized to improve yield while taking into account timing criticalities of nets in the integrated circuit.

The present invention may be a system, a method, and/or a computer program product. The computer program product may include a computer readable storage medium (or media) having computer readable program instructions thereon for causing a processor to carry out aspects of the present invention. The computer readable storage medium can be a tangible device that can retain and store instructions for use by an instruction execution device.

The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method of global routing of integrated circuits, the method comprising:
responsive to initiating global routing on an integrated circuit:
grouping, using a processor, a plurality of nets into a plurality of buckets, the grouping based on timing criticalities associated with the nets;
assigning different target congestion ratios (TCRs) to each of the plurality of buckets, the TCRs selected based on the timing criticalities associated with the nets in the buckets; and
executing, using the processor, for each of the plurality of nets:
determining a TCR for the net based on the TCR assigned to the bucket containing the net;

performing global routing of the net according to the TCR and to one or more constraints associated with the net; and in response to the performing global routing of the net resulting in violating at least one of the one or more constraints associated with the net and to a stopping criteria not being met:

incrementing the TCR for the net by a specified amount; and repeating the performing global routing and incrementing until at least one of the performing global routing of the net results in all of the one or more constraints being met and a stopping criteria is met, wherein wires are placed on the integrated circuit based at least in part on the grouping, assigning, and executing.

2. The method of claim 1, wherein the one or more constraints include a routing constraint.

3. The method of claim 1, wherein one of the one or more constraints is selected from the group consisting of a congestion violation, a length violation, and a timing violation.

4. The method of claim 1, wherein a first bucket is assigned a higher TCR than a second bucket based on the first bucket containing a net with a higher criticality than a net in the second bucket.

5. The method of claim 1, wherein the executing is performed in decreasing order of assigned TCR.

6. The method of claim 1, wherein each net is assigned a different TCR.

7. The method of claim 1, further comprising, subsequent to the executing, performing detailed routing on the integrated circuit.

* * * * *